(No Model.)
W. R. WHITE.
GATE.
No. 392,655. Patented Nov. 13, 1888.
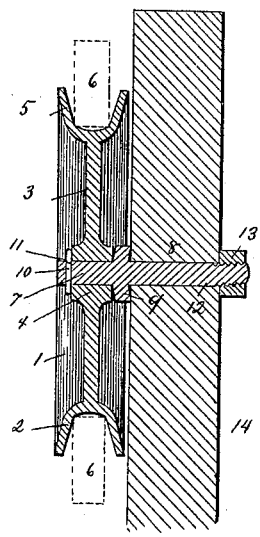
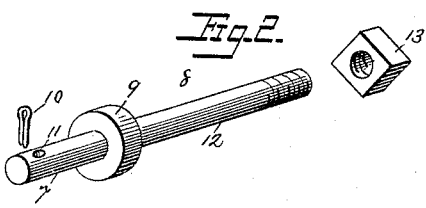
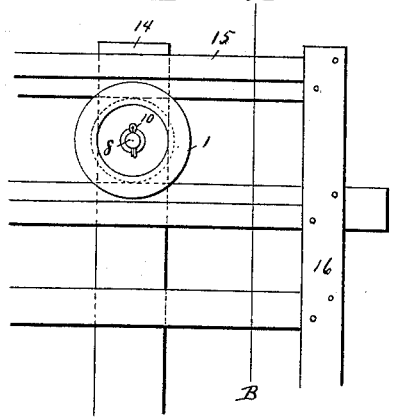
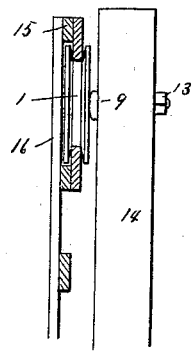
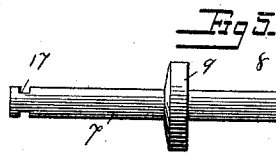
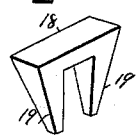
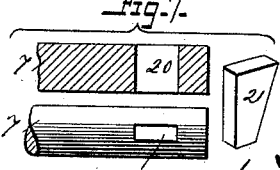
Attest:
Jno. G. Hinkel Jr.
W. H. H. Knight.
Wm. R. White
Inventor
Foster & Freeman
Attys.
N. PETERS, Photo-Lithographer, Washington, D. C.

UNITED STATES PATENT OFFICE.

WILLIAM R. WHITE, OF NEOGA, ILLINOIS.

GATE.

SPECIFICATION forming part of Letters Patent No. 392,655, dated November 13, 1888.

Application filed September 1, 1886. Serial No. 212,405. (No model.)

*To all whom it may concern:*

Be it known that I, WILLIAM R. WHITE, of Neoga, in the county of Cumberland and State of Illinois, have made certain new and useful Improvements in Gate-Supporting Rollers and Roller-Bearings, of which the following is a specification.

My invention relates to improvements in gate-supporting rollers and roller-bearings; and the novelty consists in the construction, arrangement, and combination of the parts comprised in the device, substantially as hereinafter set forth, and illustrated in the accompanying drawings, in which similar figures of reference denote similar parts.

In the drawings, Figure 1 represents a diametrical section through a roller and its bearing embodying my invention. Fig. 2 is a detail perspective view of the roller-bearing detached from its support. Fig. 3 is a front elevation of a portion of a gate provided with my invention. Fig. 4 is a sectional view taken on the line A B of Fig. 3. Figs. 5, 6, and 7 illustrate a modified form of the means employed to hold the roller in position upon its bearings.

My invention, while it is adapted for use in connection with various devices, is yet especially designed for use in connection with sliding gates to facilitate the opening or closing of the same, and is so constructed and arranged with relation to the gate as to hold the same against lateral displacement when the gate is in motion with a minimum of friction, while affording a firm rolling support therefor.

A further end contemplated by the invention is the connection of the rolling support above referred to with a bearing, which in practice not only operates to maintain said rolling support within certain limits as regards the lateral movement thereof without causing undue friction of parts, but also to maintain said rolling support at all times in a predetermined position as regards a post or other fixed support to which it is desired to connect said rolling support.

To the above ends I provide a wheel or roller, 1, with a flanged tread slightly lower in the center 2, connected by a thin web, 3, with a hub, 4, which projects from said web at opposite sides thereof to form an elongated journal-box for the reception of the bearing bolt or support upon which the wheel is mounted, as will be explained. The flanges 5 extend from the tread 2 at an angle therewith, so that when a rail, 6, (shown by dotted lines in Fig. 1,) is bearing upon the tread 2 of said roller its lower edges only will be engaged by said flanges, thereby in practice generating but slight friction between said rail and wheel, while securely holding the former against lateral displacement. I mount the wheel or roller thus constructed upon one end, 7, of a spindle or bearing bolt, 8, and against the outer surface of a concavo-convex collar or flange, 9, which is formed integral with said bearing, and hold said wheel in position by a key or cotter, 10, which passes through an aperture, 11, formed in the end of the portion 7 outside of the wheel or roller 1. The opposite portion 12 of the bearing 8 extends from the collar or flange 9 in alignment with the portion 7, and is provided at its end with screw-threads, which are engaged by a nut, 13, when the bearing is in position for use, as shown in Fig. 1, wherein said bearing is secured to a post, 14, its collar 9 bearing against the surface of said post and serving to hold the wheel or roller 1, which is mounted upon the portion 7 of said bearing, at a predetermined distance from said post. From said Fig. 1 it will be apparent that the concave face of the collar or flange 9 may be pressed with a greater or less degree of force against the post 14 through the medium of the nut 13 without interfering in any way with the wheel or roller 1 or increasing in the slightest degree friction of parts between said wheel and its bearing.

It will also be apparent that the outer edge of the concave face of the collar will first impinge upon the supporting-post, and will be drawn or sunk into said support by the application of longitudinal force to the bolt, which fact I deem of great importance, as I am thereby enabled to provide a firmer support for the wheel, as well as to effectually prevent lateral displacement of the bolt.

When the wheel or roller and bearing above described is used in connection with a gate, I prefer to employ a double or flanged rail, as shown in Figs. 3 and 4 at 15, therewith, as thereby ties 16 may be employed to hold the rails firmly in position.

The operation of my improvement is obvious and requires no special description.

If desired, the ends of the parts 7 and 12 of the bolt 8 may have notched side edges, as shown at 17, Fig. 5, to receive a key or cotter, 18, Fig 6, the legs 19 of which engage said notches 17.

The cotter 18 may be wedge-shaped, and when in position the ends of the legs may be bent under the parts 7 and 12, to retain said cotter in position.

If desired, the ends of said parts 7 and 12 may have apertures 20 to receive a key, 21, as shown in Fig. 7.

I claim—

A gate-supporting wheel, in combination with a supporting bearing-bolt, screw-threaded near one end and provided with a collar rigidly secured thereto, and provided with a concave face, said concave face resting against the support for the bolt, into which it is drawn or sunk as the nut engaging with the screw-threaded end is tightened, substantially as and for the purpose set forth.

In testimony whereof I have signed my name to this specification in the presence of two subscribing witnesses.

WM. R. WHITE.

Witnesses:
JOHN F. WHITE,
W. W. WHITNEY.